United States Patent
Mayumi

(10) Patent No.: US 7,804,843 B2
(45) Date of Patent: Sep. 28, 2010

(54) COMMUNICATION APPARATUS AND METHOD OF AIRBAGS FOR A VEHICLE

(75) Inventor: Nobuo Mayumi, Toyohashi (JP)

(73) Assignee: Denso Corporation, Kariya (JP)

( * ) Notice: Subject to any disclaimer, the term of this patent is extended or adjusted under 35 U.S.C. 154(b) by 922 days.

(21) Appl. No.: 11/400,813

(22) Filed: Apr. 7, 2006

(65) Prior Publication Data

US 2006/0235593 A1    Oct. 19, 2006

(30) Foreign Application Priority Data

Apr. 11, 2005   (JP) .............................. 2005-113667

(51) Int. Cl.
*H04J 7/02*   (2006.01)
(52) U.S. Cl. ..................... 370/449; 370/305; 370/354
(58) Field of Classification Search ................. 375/360; 701/45; 370/200–253, 272–390, 431–546
See application file for complete search history.

(56) References Cited

U.S. PATENT DOCUMENTS

| 5,787,132 | A | * | 7/1998 | Kishigami et al. ........... 375/354 |
| 5,877,958 | A | * | 3/1999 | Horiuchi et al. ............. 701/102 |
| 6,345,220 | B1 | * | 2/2002 | Ikegami ....................... 701/45 |
| 2006/0153326 | A1 | * | 7/2006 | Choi ............................ 375/360 |

FOREIGN PATENT DOCUMENTS

| JP | 10-111743 | 4/1998 |
| JP | 2000-165421 | 6/2000 |
| JP | 2003-032159 | 1/2003 |
| JP | 2004-166065 | 6/2004 |

OTHER PUBLICATIONS

Office Action dated Sep. 8, 2009 from Japan Patent Office in the corresponding patent application No. 2005-113667 with English translation.
Office Action dated Jul. 1, 2010 in Japanese Application No. 2005-113667.

* cited by examiner

*Primary Examiner*—Ricky Ngo
*Assistant Examiner*—Iqbal Zaidi
(74) *Attorney, Agent, or Firm*—Harness, Dickey & Pierce, PLC

(57) ABSTRACT

A communication apparatus in an airbag system includes an airbag ECU as a master unit, sets of communication lines and slave sensor devices. The slave sensor devices are respectively connected to the airbag ECU through the set of communication lines. The airbag ECU transmits data transmission request commands to the respective sets of communication lines at timings which are different from each other. Thus, transmission timings in the respective sets of communication lines are prevented from being synchronized, and noise which develops in consequence of the data communications between the master unit and the slave sensor devices can be reduced.

15 Claims, 9 Drawing Sheets

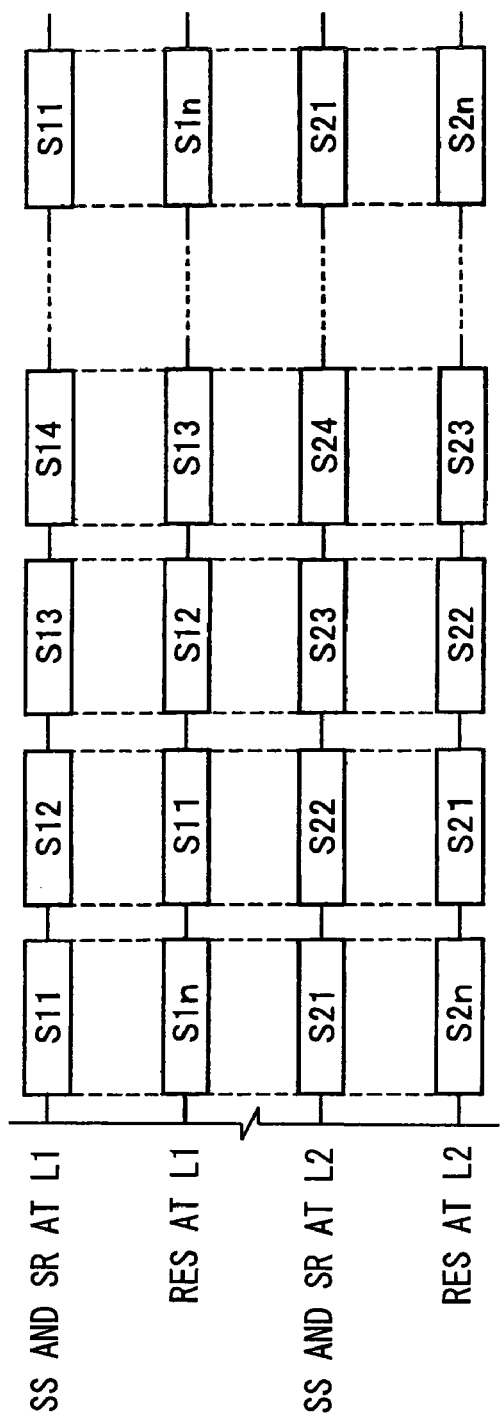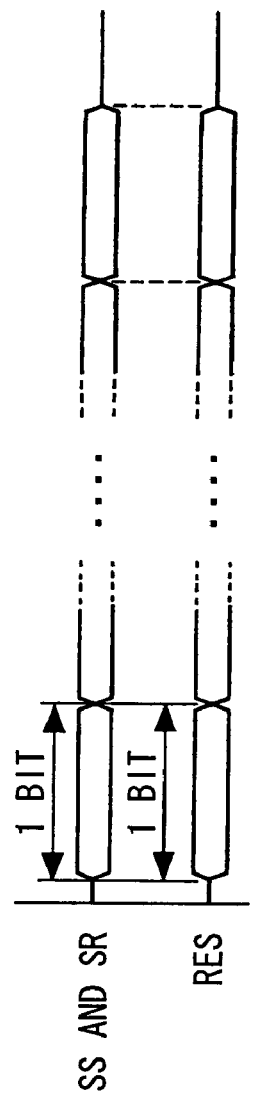
FIG. 11 PRIOR ART
FIG. 12 PRIOR ART

COMMUNICATION APPARATUS AND METHOD OF AIRBAGS FOR A VEHICLE

CROSS REFERENCE TO RELATED APPLICATION

This application is based on and incorporates herein by reference Japanese Patent Application No. 2005-113667 filed on Apr. 11, 2005.

FIELD OF THE INVENTION

The present invention relates to a communication apparatus, which transmit data in response to a request, and a method of communications.

BACKGROUND OF THE INVENTION

In recent years, automobiles have sophisticated multiple functions. Consequently, a large number of sensors have come into use in order to obtain various vehicular information items. The sensors are respectively connected to a vehicular control apparatus through wire harnesses. Therefore, the number of the wire harnesses increases and cause problems of heavier weight and higher cost. On the other hand, it is proposed that a plurality of sensors is connected to a vehicular control apparatus through common communication lines. Here, various detected vehicular information items are transmitted to the vehicular control apparatus by serial communication. Such a communication apparatus is disclosed in, for example, JP-A-2003-32159.

This serial communication apparatus includes a master controller, one set of communication lines, and a plurality of slave controllers. The master controller serially transmits slave-controller specifying information items and request information items to the plurality of slave controllers through the communication lines. The slave controllers corresponding to the slave-controller specifying information items serially transmit the information items corresponding to the request information items to the master controller through the communication lines.

Meanwhile, when the number of sensors increases still more, a plurality of sets of communication lines L1, L2 to which a master controller M10 and a plurality of slave controllers S11 to S14 and S21 to S24 are connected as shown in FIG. 8 are employed in order to enhance the transmission efficiency of vehicular information items. In FIG. 8, only two communication lines L1 and L2 are shown. In this case, as shown in FIG. 9 by way of example, the master controller M10 delivers both slave-controller specifying information items SS and request information items SR to the respective sets of communication lines L1 and L2 at the same timing. As shown in FIG. 10, the slave-controller specifying information SS and the request information SR are successively delivered and serially transmitted bit by bit in synchronism with a clock CLK of predetermined period T' which is generated by the master controller M10. As shown in FIG. 11 by way of example, the slave controller corresponding to the slave-controller specifying information item SS delivers response information item RES corresponding to the request information item SR, to the master controller M10 at a timing at which the next slave-controller specifying information item SS and request information item SR are transmitted. As shown in FIG. 12, the information item corresponding to the request information SR is successively transmitted and serially transmitted bit by bit in synchronism with the next slave-controller specifying information and request information.

As shown in FIG. 13, therefore, the slave-controller specifying information items SS, request information items SR and response information items RES corresponding to the request information items SR are successively delivered and serially transmitted bit by bit at the same timing in all the sets of communication lines L1 and L2. These information items are transmitted as the changes of voltages or currents. Accordingly, the timings of the changes of the respective bits of the information items to-be-transmitted are synchronized in all the sets of communication lines L1 and L2, and the changes of the voltages or currents become large, so that noise develops. The noise will cause adversary influence on radio broadcasting.

SUMMARY OF THE INVENTION

The present invention has its object to provide a communication apparatus and method which can reduce noise developing in consequence of data communications between a master unit and slave units.

A communication apparatus has a master unit, a plurality of sets of communication lines and a plurality of slave units. The master unit serially transmits data transmission request commands each of which specifies the master device as a subject for communications and makes a request for transmission of data to the respective sets of communication lines in synchronism with a clock of a predetermined period. Each of the slave units determines whether it is the subject for communications on the basis of the data transmission request command and, in case of the subject for communications, serially transmits to the master unit the data corresponding to the data transmission request command. The timings which the master unit serially transmits the data transmission request commands are made different a predetermined time interval from each other among the sets of communication lines.

BRIEF DESCRIPTION OF THE DRAWINGS

The above and other objects, features and advantages of the present invention will become more apparent from the following detailed description made with reference to the accompanying drawings. In the drawings:

FIG. 11 shows a time chart concerning the slave-controller specifying information items, the request information items and information items corresponding to the request information items in the conventional device;

FIG. 12 shows a time chart concerning the specified slave-controller specifying information, request information and information corresponding to the request information in the conventional device.

DETAILED DESCRIPTION OF THE PREFERRED EMBODIMENT

Figure 1:
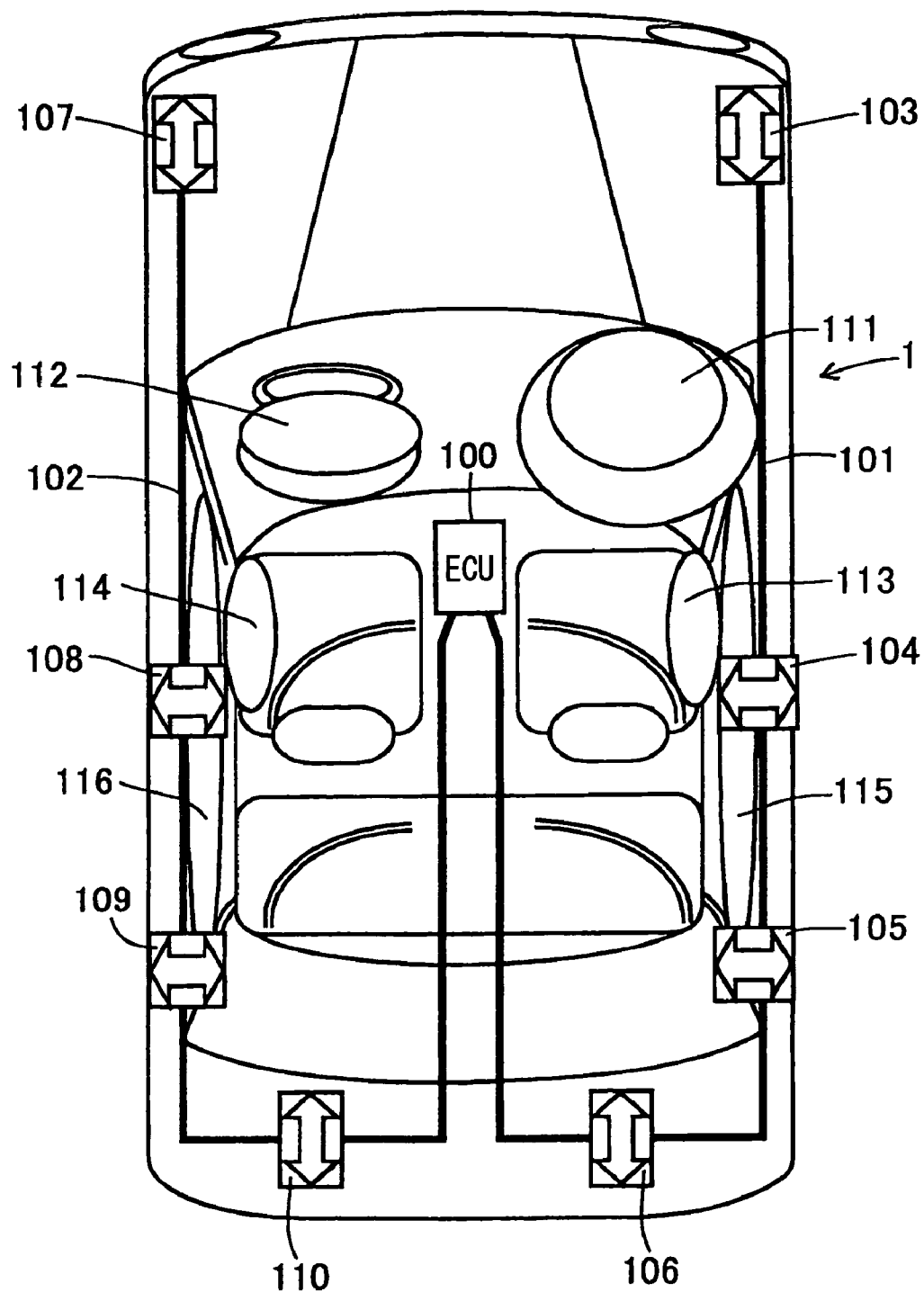
FIG. 1 shows a schematic top plan view an airbag system in an embodiment of the present invention.

Referring first to FIG. 1, a communication apparatus is implemented as an airbag system 1 that includes an airbag electronic control unit (ECU) 100 as a master unit, sets of communication lines 101 and 102, slave sensor units 103 to 110 as slave units, a front airbag 111 for a driver's seat, a front airbag 112 for an assistant driver's seat, body side airbags 113 and 114, and head side (curtain) airbags 115 and 116.

Figure 2:
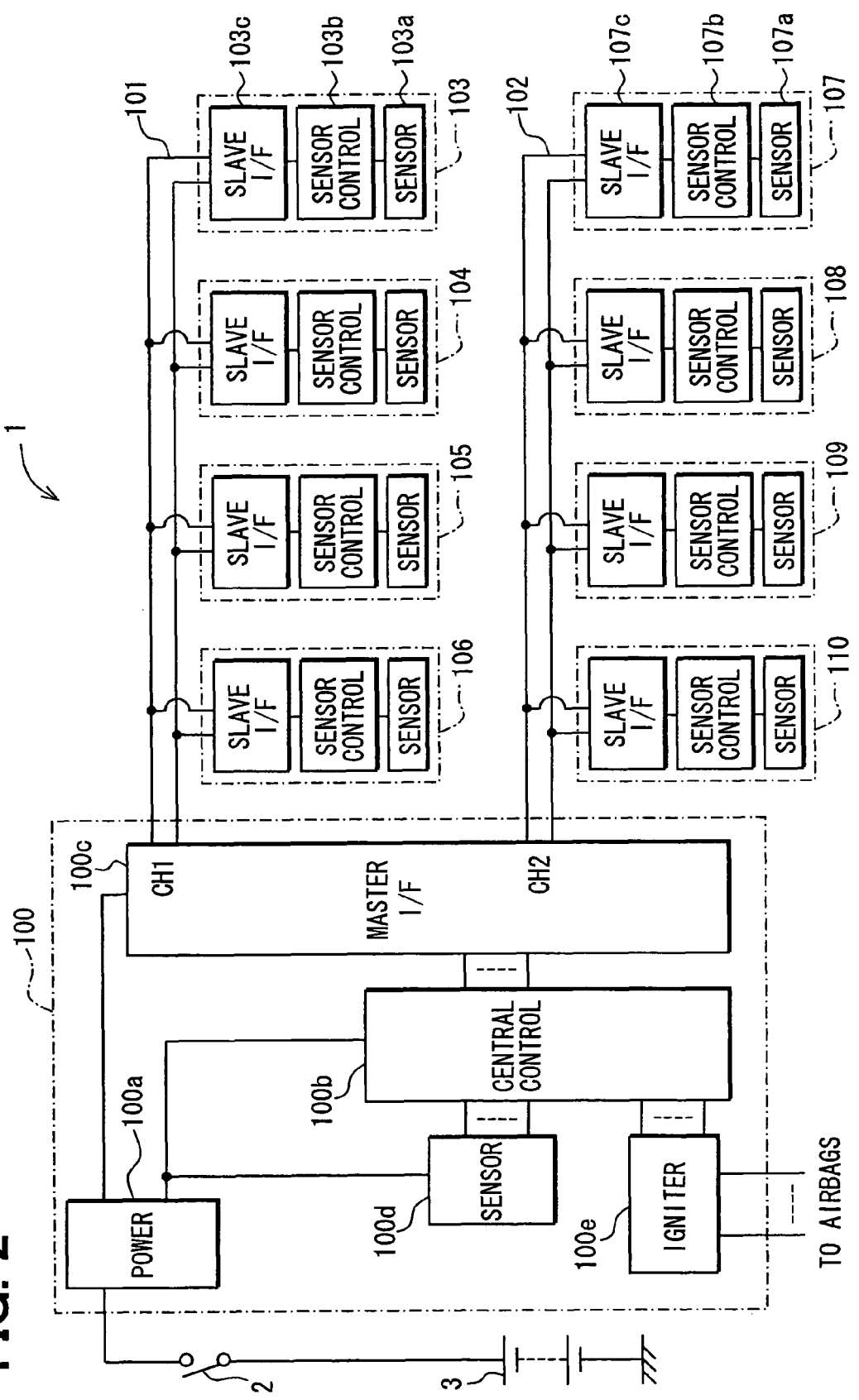
FIG. 2 shows a block diagram of the airbag system in the embodiment.

The airbag ECU 100 is a device which inflates the driver's-seat front airbag 111, assistant-driver's-seat front airbag 112, body side airbags 113 and 114, and head side airbags 115 and 116 on the basis of accelerations indicative of magnitudes of crash detected by the slave sensor units 103 to 110 and a sensor 100d disposed in this airbag ECU 100 as shown in FIG. 2. This airbag ECU 100 is disposed at substantially the central part of a vehicle.

The sets of communication lines 101 and 102 are signal lines for transmitting/receiving data between the airbag ECU 100 and the slave sensor units 103 to 110. Here, the set of communication lines 101 has the slave sensor units 103 to 106 connected thereto. On the other hand, the set of communication lines 102 has the slave sensor units 107 to 110 connected thereto. The sets of communication lines 101 and 102 to which the slave sensor units 103 to 110 are connected are respectively connected to the airbag ECU 100.

The slave sensor units 103 to 110 are sensors which detect the accelerations of the individual parts of the vehicle, and which transmit the results of the detections through the sets of communication lines 101 and 102 in response to data transmission requests from the airbag ECU 100. More specifically, the slave sensor units 103, 106, 107 and 110 are the sensors which detect the accelerations in the front and rear direction of the vehicle. Here, the slave sensor units 103 and 107 are respectively disposed on the right part and left part of the front part of the vehicle. Besides, the slave sensors 106 and 110 are respectively disposed on the right part and left part of the rear part of the vehicle. The slave sensors 104, 105, 108 and 109 are the sensors which detect the accelerations in the right and left direction of the vehicle. Here, the slave sensors 104 and 108 are respectively disposed in the vicinities of right and left B-pillars at the side parts of the vehicle. Besides, the slave sensors 105 and 109 are respectively disposed in the vicinities of right and left C-pillars at the side parts of the vehicle.

As shown in FIG. 2, the airbag ECU 100 includes a power source circuit 100a, a central control circuit 100b, a master interface (I/F) circuit 100c, the sensor 100d and a airbag igniter circuit 100e.

The power source circuit 100a is a circuit by which the output voltage of a battery 3 fed through an engine ignition switch 2 is converted into voltages suitable for the operations of the central control circuit 100b, master I/F circuit 100c and sensor 100d, so as to feed the voltages to them. The input terminal of the power source circuit 100a is connected to the anode terminal of the battery 3 through the ignition switch 2, and the cathode terminal of the battery 3 is grounded to the chassis of a vehicle. Besides, the output terminals of the power source circuit 100a are respectively connected to the power source terminals of the central control circuit 100b as well as the sensor 100d and the master I/F circuit 100c.

The central control circuit 100b is a circuit which collects the acceleration data of the slave sensor units 103 to 110 through the master I/F circuit 100c, which determines whether or not the individual airbags (not shown) are to be inflated, by using the collected acceleration data together with the acceleration data of the sensor 100d, and which controls the igniter circuit 100e on the basis of the results of the determination. More specifically, the central control circuit 100b outputs data transmission request commands for the slave sensor units 103 to 110 to the master I/F circuit 100c. Each of the data transmission request commands is a command which designates or specifies one slave sensor and makes a request for the transmission of the data.

Besides, the central control circuit 100b determines whether or not the individual airbags are to be inflated on the basis of the acceleration data of the slave sensor units 103 to 110 as are outputted from the master I/F circuit 100c and the acceleration data outputted from the sensor 100d. Further, the central control circuit 100b outputs firing signals to the igniter circuit 100e on the basis of the determined results. The firing signals are outputted to only the airbags which need to be inflated. The data buses of the central control circuit 100b on one side thereof are connected to the master I/F circuit 100c. Besides, the data buses of the central control circuit 100b on the other side thereof are connected to the sensor 110d. Further, the output terminals of the central control circuit 100b are respectively connected to the igniter circuit 100e.

The master I/F circuit 100c is a circuit which exchanges the data transmission request commands and the acceleration data with the slave sensor units 103 to 110 through the sets of communication lines 101 and 102. More specifically, the master I/F circuit 100c serially transmits the data transmission request commands for the slave sensor units 103 to 110 as are outputted from the central control circuit 100b in synchronism with a clock of period T which is internally generated. Further, the master I/F circuit 100c serially transmits data transmission request commands for the slave sensor units 107 to 110, with a delay of predetermined time interval previously set, after data transmission request commands for the slave sensor units 103 to 106. The predetermined time interval may be any time interval other than the integral times of the period T of the clock. This interval may be set at, for example, T/2.

The data transmission request commands for the slave sensor units 103 to 106 are serially transmitted through the set of communication lines 101 from a channel CH1. On the other hand, the data transmission request commands for the slave sensor units 107 to 110 are serially transmitted through the set of communication lines 102 from a channel CH2. Each of the data transmission request commands is represented by, for example, the change of a voltage, and "1" or "0" is determined by the ratio between a high level and a low level within one period of the clock.

Besides, the master I/F circuit 100c outputs to the central control circuit 100b, the acceleration data from the slave sensor units 103 to 110 as are serially transmitted in synchronism with the next data transmission request commands. Here, the acceleration data from the slave sensor units 103 to 106 are serially transmitted to the channel CH1 through the set of communication lines 101. On the other hand, the acceleration data from the slave sensor units 107 to 110 are serially transmitted to the channel CH2 through the set of communication lines 102. Each of the acceleration data is represented by, for example, the change of a current, and "1" or "0" is determined by whether a current level after ½ period from the start of one period of the clock is higher or lower than a predetermined value. The channel CH1 of the master I/F circuit 100c is connected to the slave sensor units 103 to 106 through the set of communication lines 101. Besides, the channel CH2 is connected to the slave sensor units 107 to 110 through the set of communication lines 102. Further, the data buses of the master I/F circuit 100c are connected to those of the central control circuit 100b.

The sensor 100d is a sensor which is disposed within the airbag ECU 100, which detects the acceleration of the vehicle in the front and rear direction thereof, and which outputs the data of the detected acceleration to the central control circuit 100b. The data buses of the sensor 100d are connected to those of the central control circuit 100b.

The igniter circuit 100e is a circuit which inflates the individual airbags on the basis of the firing signals which are outputted from the central control circuit 100b. The plurality of input terminals of the igniter circuit 100e are respectively connected to the output terminals of the central control circuit 100b. Besides, the output terminals of the igniter circuit 100e are respectively connected to the corresponding airbags.

Since all the slave sensor units 103 to 110 are identical in configuration, the slave sensor unit 103 shall be described here. The slave sensor unit 103 includes a sensor 103a, a sensor control circuit 103b and a slave interface (I/F) circuit 103c.

The sensor 103a is a sensor which detects the acceleration, and which outputs the data of the detected acceleration to the sensor control circuit 103b. This sensor 103a is connected to the sensor control circuit 103b.

The sensor control circuit 103b is a circuit which determines whether or not the sensor 103a is a subject for communications on the basis of a data transmission request command outputted from the slave I/F circuit 103c, and which, in case of the subject for communications, converts the detected result of the acceleration outputted from the sensor 103a into the acceleration data so as to output this acceleration data to the slave I/F circuit 103c. This sensor control circuit 103b is connected to both sensor 103a and the slave I/F circuit 103c.

The slave I/F circuit 103c is a circuit which exchanges the data transmission request command and the acceleration data with the master I/F circuit 100c through the set of communication lines 101. More specifically, the slave I/F circuit 103c outputs to the sensor control circuit 103b, the data transmission request command serially transmitted from the master I/F circuit 100c. Besides, the slave I/F circuit 103c serially transmits the acceleration data outputted from the sensor control circuit 103b in synchronism with the next data transmission request command. This slave I/F circuit 103c is connected to both set of communication lines 101 and the sensor control circuit 103b.

In operation, when the ignition switch 2 is turned on, the power source circuit 100a converts the output voltage of the battery 3 into the voltages suitable for the operations of the central control circuit 100b, master I/F circuit 100c and sensor 100d and feeds these voltages to them. When fed with the voltages, the central control circuit 100b, master I/F circuit 100c and sensor 100d start operating.

Figure 3:
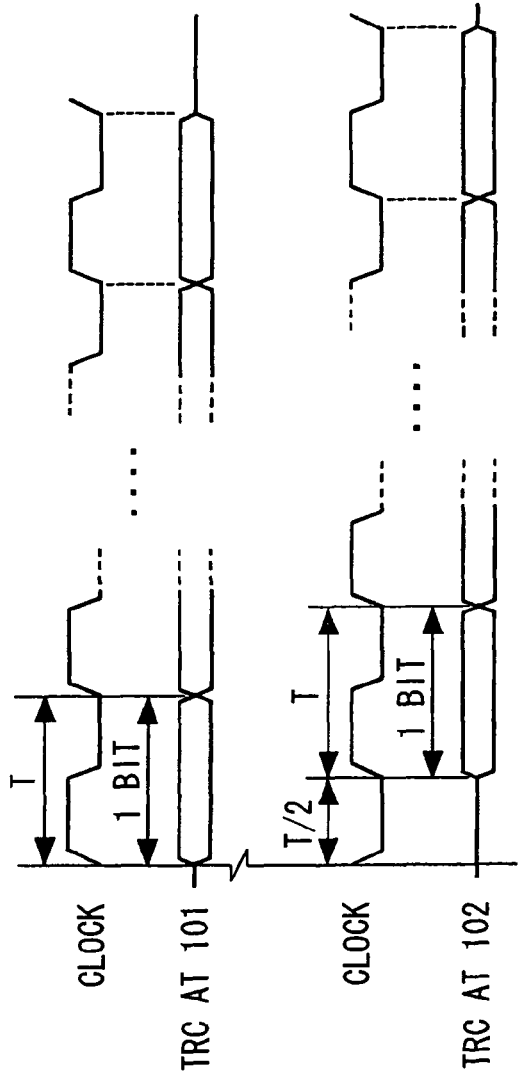
FIG. 3 shows a time chart concerning specified data transmission request commands in the embodiment.
Figure 4:
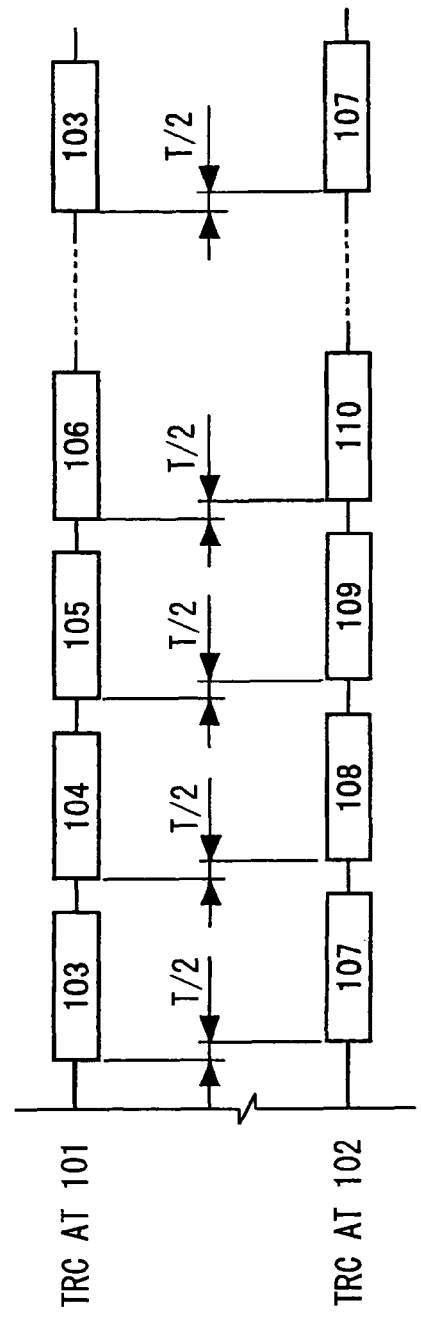
FIG. 4 shows a time chart concerning data transmission request commands in the embodiment.

The central control circuit 100b outputs the data transmission request commands TRC for the slave sensor units 103 and 107, to the master I/F circuit 100c. As shown in FIG. 3, the master I/F circuit 100c serially transmits the data transmission request command TRC for the slave sensor unit 103, to the set of communication lines 101 in synchronism with the clock internally generated. Thereafter, with the delay of the predetermined time interval T/2, the master I/F circuit 100c serially transmits the data transmission request command TRC for the slave sensor unit 107 to the set of communication lines 102 in synchronism with the clock. Thenceforth, as shown in FIG. 4, the data transmission request commands TRC for the slave sensor units 104 to 106 and 108 to 110 are serially transmitted from the master I/F circuit 100c to the sets of communication lines 101 and 102 at similar timings. As illustrated in FIG. 3, the master I/F circuit 100c simultaneously communicates with the sets of communication lines 101 and 102.

The slave I/F circuit 103c outputs to the sensor control circuit 103b, the data transmission request command TRC which is serially transmitted from the master I/F circuit 100c through the set of communication lines 101. Since the data transmission request command TRC is a command for the slave sensor unit 103, the sensor control circuit 103b converts the detected result of the acceleration outputted from the sensor 103a, into the acceleration data. It outputs this acceleration data to the slave I/F circuit 103c.

Figure 5:
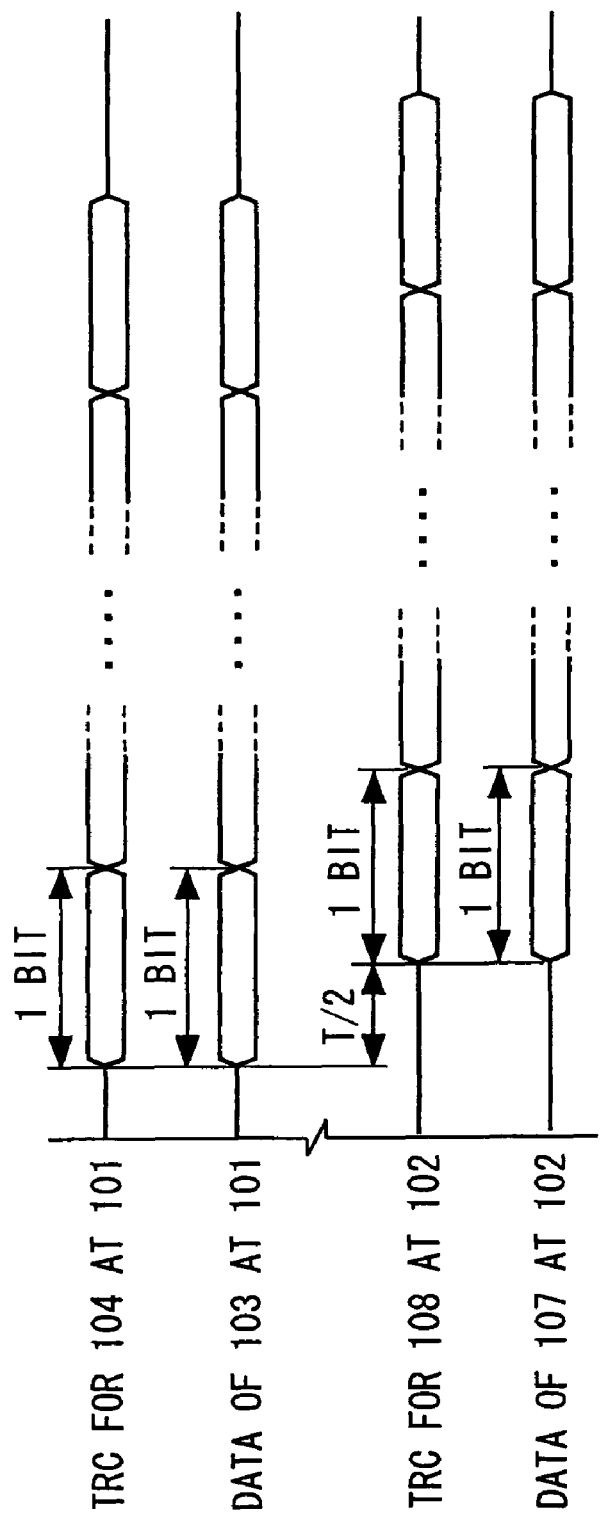
FIG. 5 shows a time chart concerning specified data transmission request commands and acceleration data in the embodiment.
Figure 6:
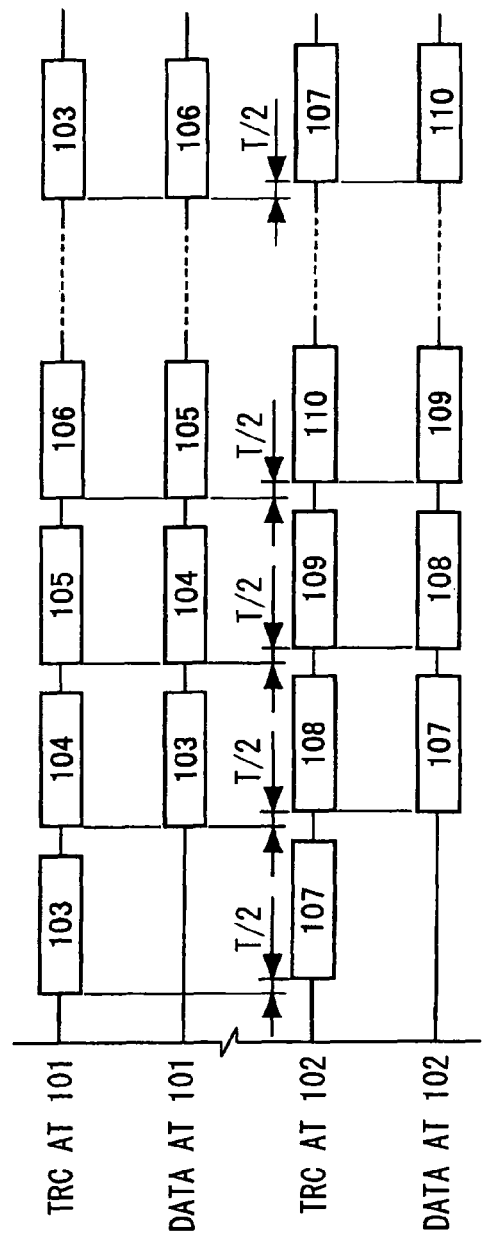
FIG. 6 shows a time chart concerning data transmission request commands and acceleration data in the embodiment.

As shown in FIG. 5, the slave I/F circuit 103c serially transmits the acceleration data DATA outputted from the sensor control circuit 103b to the master I/F circuit 100c in synchronism with the data transmission request command TRC for the slave sensor unit 104. Likewise, the slave I/F circuit 107c outputs to the sensor control circuit 107b the data transmission request command TRC which is serially transmitted from the master I/F circuit 100c through the set of communication lines 102. Since the data transmission request command TRC is a command for the slave sensor unit 107, the sensor control circuit 107b converts the detected result of the acceleration outputted from the sensor 107a into the acceleration data. It outputs this acceleration data DATA to the slave I/F circuit 107c. The slave I/F circuit 107c serially transmits the acceleration data DATA outputted from the sensor control circuit 107b to the master I/F circuit 100c in synchronism with the data transmission request command TRC for the slave sensor 108. Thenceforth, as shown in FIG. 6, the acceleration data DATA are serially transmitted from the slave sensor units 104 to 106 and 108 to 110 to the sets of communication lines 101 and 102 at similar timings.

The central control circuit 100b determines whether or not the individual airbags are to be inflated on the basis of the acceleration data from the slave sensor units 103 to 110 as have been thus collected, and the acceleration data of the sensor 100d. Further, the central control circuit 100b outputs the firing signals to the igniter circuit 100e on the basis of the results of the determinations. The igniter circuit 100e inflates the airbags on the basis of the firing signals outputted from the central control circuit 100b so as to protect occupants of the vehicle.

According to this embodiment, the data transmission request commands are serially transmitted to the respective sets of communication lines 101 and 102 at the timings which differ the predetermined time interval T/2 from each other, whereby the transmission timings of the data transmission request commands in the respective sets of communication lines 101 and 102 can be prevented from being synchronized with each other.

Moreover, the predetermined time interval is set to the time interval T/2 other than the integral times of the period T of the clock, whereby the timings of the changes of the respective bits of the data transmission request commands in the respective sets of communication lines 101 and 102 can be prevented from being synchronized with each other.

Figure 7:
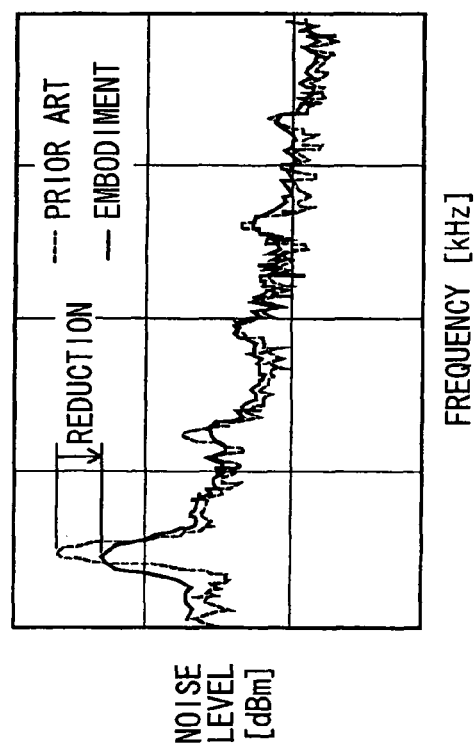
FIG. 7 shows results of noise levels measured in the embodiment.
Figure 8:
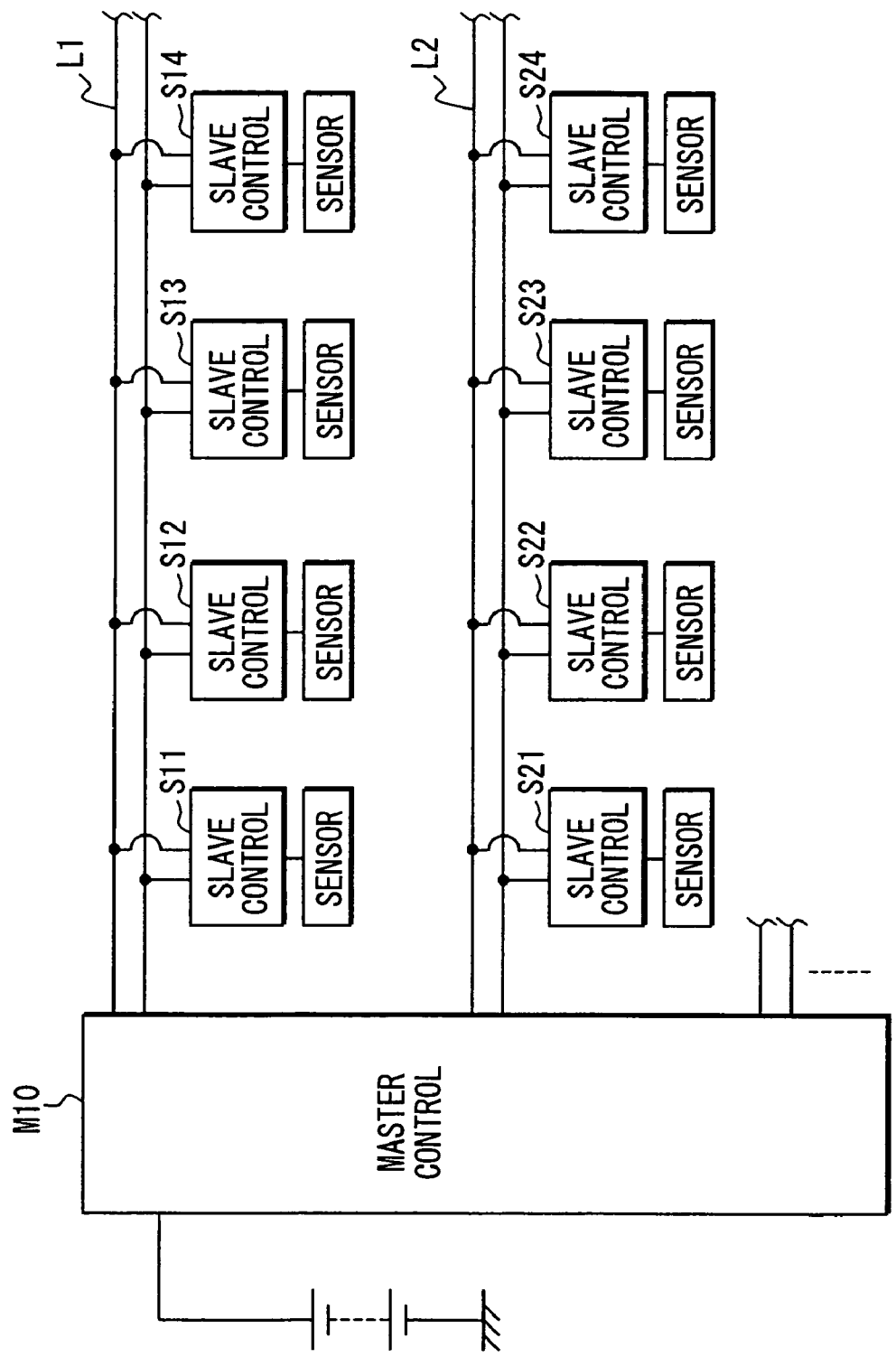
FIG. 8 shows a block diagram of a conventional communication apparatus.
Figure 9:
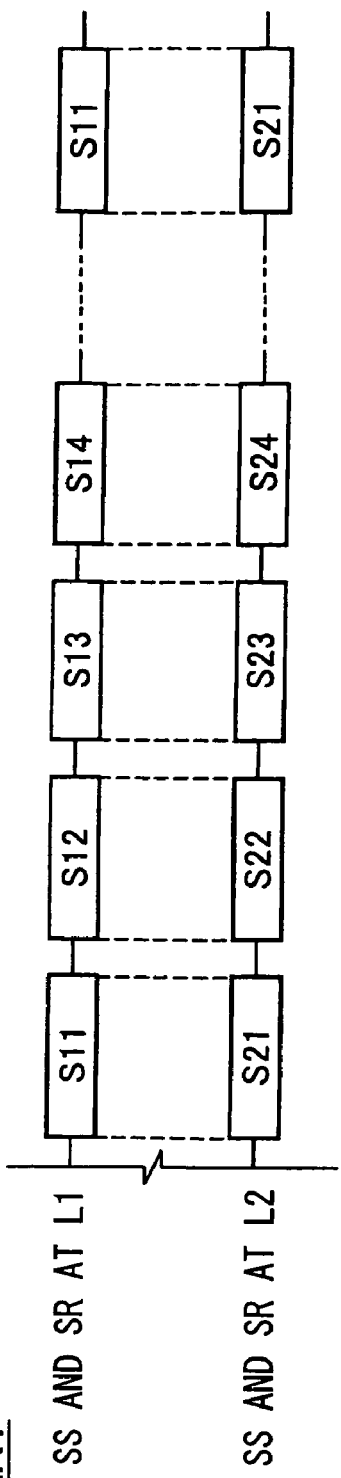
FIG. 9 shows a time chart concerning slave-controller specifying information items and request information items in the conventional device.
Figure 10:
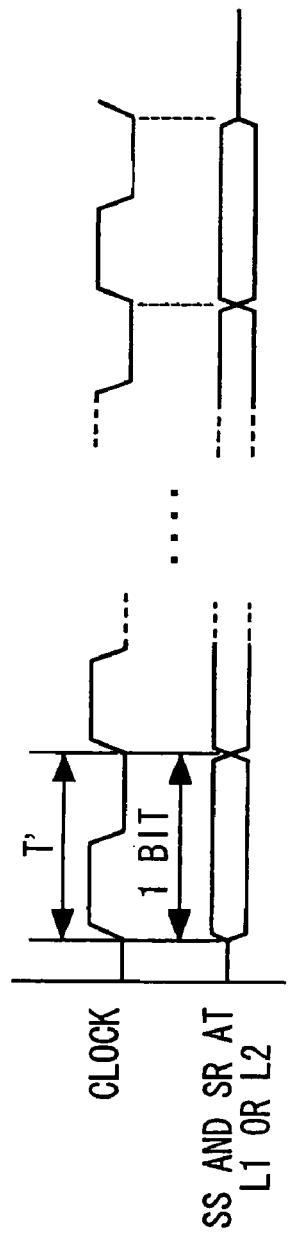
FIG. 10 shows a time chart concerning the specified slave-controller specifying information and request information in the conventional device.
Figure 13:
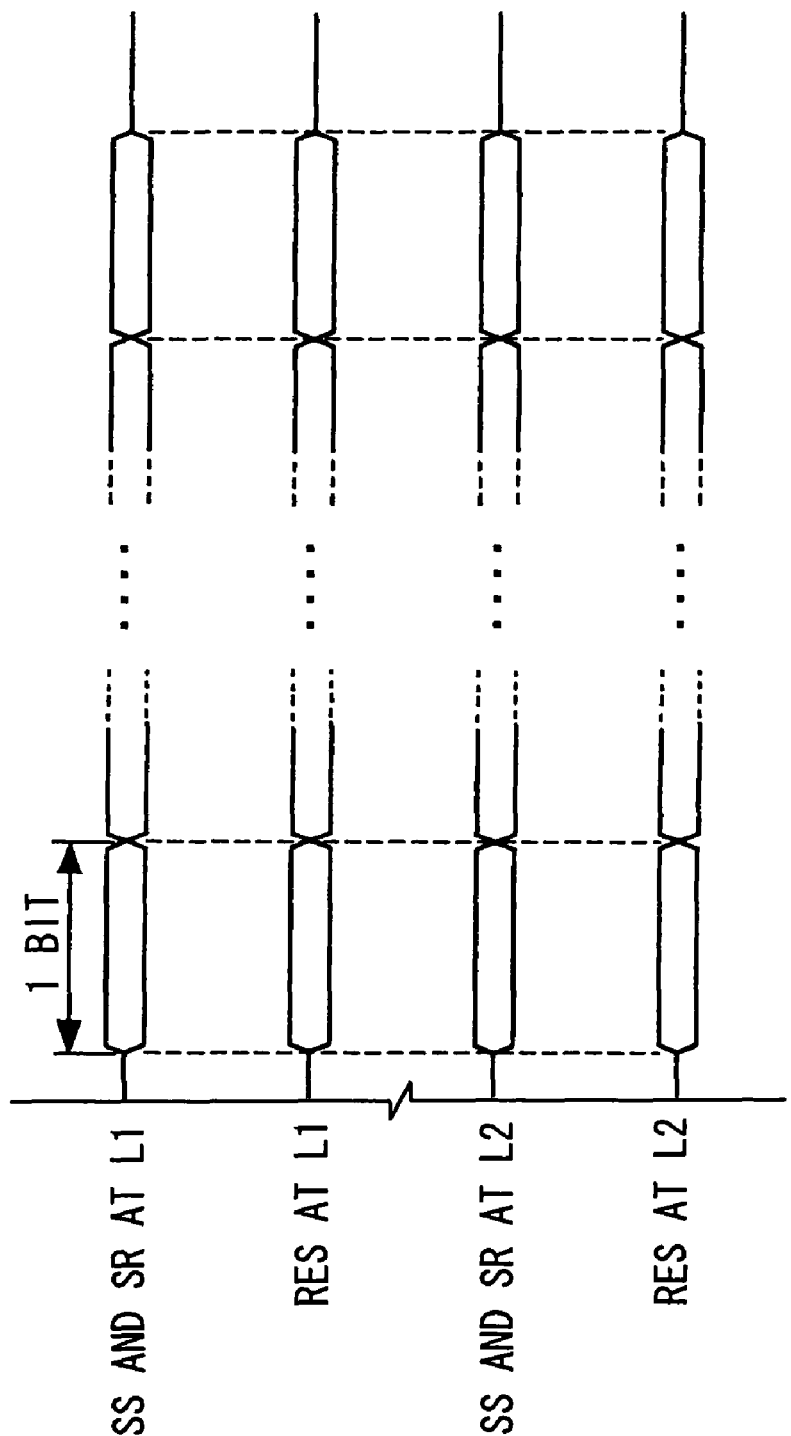
FIG. 13 shows another time chart concerning the specified slave-controller specifying information items, request information items and information items corresponding to the request information items in the conventional device.

Thus, those changes of the voltages or currents which occur in consequence of the data transmission request commands and the transmission of the data can be suppressed, and the peak level of noise can be made lower than in the related art as shown in FIG. 7.

Although four slave sensor units are connected to each of the two sets of communication lines in this embodiment, three or more sets of communication lines may well be included. At least one slave sensor unit may be connected to each set of communication lines.

Besides, the predetermined time interval may well be changed within a predetermined range specified before each time the data transmission request command is serially transmitted. Thus, frequency components which are relevant to the data transmission request commands and the transmissions of the data can be dispersed, and the noise can be reduced still further.

Still further modifications are possible without departing from the spirit of the invention.

What is claimed is:

1. A communication apparatus comprising:
   a master unit;
   a plurality of sets of communication lines connected to the master unit; and
   a plurality of slave units connected to each of the plurality of sets of communication lines,
   wherein the master unit serially transmits data transmission request commands each of which specifies the master device as a subject for communications and makes a request for transmission of data to each of the plurality of sets of communication lines in synchronism with a clock of predetermined period,
   wherein each of the slave units determines whether it is the subject for communications on the basis of the data transmission request command, and in case of the subject for communications serially transmits the data corresponding to the data transmission request command to the master unit,
   wherein the master unit serially transmits the data transmission request commands at timings which are different in a predetermined time interval from each other among the sets of communication lines,
   wherein the master unit simultaneously communicates with the plurality of sets of communication lines,
   wherein the predetermined time interval is one half of a cycle period of the clock, and
   wherein the master unit, the sets of communication lines and the slave units are mounted on a vehicle so that the master unit activates airbags.

2. A communication method in a vehicle having airbags, a master unit, a first plurality of slave units provided at a right side of the vehicle to detect accelerations, a second plurality of slave units provided at a left side of the vehicle to detect accelerations, a first communication line connecting the master unit and the first plurality of slave units, and a second communication line separate from the first communication line, the second communication line connecting the master unit and the second plurality of slave units, the method comprising:
   generating a clock at every predetermined interval;
   transmitting first data request commands from the master unit to the first plurality of slave units through the first communication line serially at first timings which are in timed relation with the clock;
   transmitting second data request commands from the master unit to the second plurality of slave units through the second communication line serially at second timings which are in timed relation with the clock, the second timings are delayed from the first timings a delay period which is other than an integer times of the predetermined interval; wherein
   the master unit simultaneously communicates through the first and second communication lines, and
   the first plurality of slave units and the second plurality of slave units transmit acceleration detection results in response to the first data request commands and the second data request commands, respectfully, so that the master unit activates the air bags in response to the acceleration detection results.

3. The communication method as defined in claim 2, wherein the delay period is less than the predetermined interval.

4. The communication method as defined in claim 3, wherein the delay period is about one half the predetermined interval.

5. The communication apparatus as defined in claim 1, wherein the master unit includes an interface circuit connected to the plurality of sets of communication lines for communicating with each of the plurality of slave units.

6. The communication method as defined in claim 2, wherein the first data request commands and the second data request commands are transmitted from first and second communication channels, respectively, of the master unit which are different from each other.

7. The communication apparatus as defined in claim 1, wherein the master unit transmits the data transmission request commands serially specifying different slave units in each of the plurality of sets of communication lines.

8. The communication method as defined by claim 2, wherein transmitting the first data request commands and transmitting the second data request commands are transmitted serially specifying different slave units in each of the first and second communication lines.

9. The communication apparatus as defined by claim 1, wherein each of the plurality of sets of communication lines is connected to a different channel of the master unit.

10. The communication method as defined by claim 2, further comprising connecting the first and second communication lines to different channels of the master unit.

11. A communication apparatus in a vehicle having airbags comprising:
    a master unit;
    a first plurality of slave units provided at a right side of the vehicle to detect accelerations;
    a second plurality of slave units provided at a left side of the vehicle to detect accelerations;
    a first set of communication lines electrically connecting the master unit with the first plurality of slave units;
    a second set of communication lines electrically connecting the master unit with the second plurality of slave units; wherein
    the master unit serially transmits data transmission request commands each of which specifies the master device as a subject for communications and makes a request for transmission of data to each of the first and second sets of communication lines in synchronism with a clock of predetermined period;
    each of the slave units determines whether it is the subject for communications on the basis of the data transmission request command, and in case of the subject for communications serially transmits the data corresponding to the data transmission request command to the master unit;

the master unit serially transmits the data transmission request commands at timings which are different in a predetermined time interval from each other between the first and second sets of communication lines;

the master unit simultaneously communicates with the first and second communication lines; and the first plurality of slave units and the second plurality of slave units transmit acceleration detection results in response to the first data request commands and the second data request commands, respectfully, so that the master unit activates the air bags in response to the acceleration detection results.

12. The communication apparatus as defined in claim 1, wherein each of the plurality of slave units is an accelerometer.

13. The communication apparatus as defined in claim 1, wherein the master unit serially transmits the data transmission request commands to each of the plurality of sets of communication lines, the predetermined time interval being defined between an initial transmission of the data transmission request commands to one of the plurality of sets of communication lines and an initial transmission of the data transmission request commands to a subsequent one of the plurality of sets of communication lines.

14. The communication method as defined in claim 2, wherein:

the step of transmitting the first data request commands includes initiating the transmission of the first data request commands at a first time;

the step of transmitting the second data request commands includes initiating the transmission of the second data request commands at a second time; and the second time is delayed from the first time by the delay period.

15. The communication apparatus as defined in claim 11, wherein the master unit serially transmits the data transmission request commands to each of the plurality of sets of communication lines, the predetermined time interval being defined between an initial transmission of the data transmission request commands to one of the plurality of sets of communication lines and an initial transmission of the data transmission request commands to a subsequent one of the plurality of sets of communication lines.

* * * * *